United States Patent
Chen et al.

(10) Patent No.: US 6,759,149 B1
(45) Date of Patent: Jul. 6, 2004

(54) LAMINATED MEDIUM WITH ANTIFERROMAGNETIC STABILIZATION LAYERS

(75) Inventors: Qixu Chen, Milpitas, CA (US); Zhong Wu, Freemont, CA (US); Rajiv Y. Ranjan, San Jose, CA (US)

(73) Assignee: Seagate Technology LLC, Scotts Valley, CA (US)

(*) Notice: Subject to any disclaimer, the term of this patent is extended or adjusted under 35 U.S.C. 154(b) by 150 days.

(21) Appl. No.: 09/906,835

(22) Filed: Jul. 18, 2001

Related U.S. Application Data
(60) Provisional application No. 60/221,220, filed on Jul. 25, 2000.

(51) Int. Cl.[7] ............................. G11B 5/66; G11B 5/70; B05D 5/12
(52) U.S. Cl. ........................ 428/694 TM; 428/694 TS; 428/336; 428/900; 427/131; 427/132
(58) Field of Search .................... 428/694 TM, 694 TS, 428/336, 900; 427/131, 132

(56) References Cited

U.S. PATENT DOCUMENTS

| | | | |
|---|---|---|---|
| 3,915,698 A | 10/1975 | Lee et al. .................. 75/134 D |
| 4,722,869 A | * 2/1988 | Honda et al. ................ 428/611 |
| 4,833,020 A | 5/1989 | Shiroishi et al. ............ 428/336 |
| 5,304,975 A | 4/1994 | Saito et al. ............... 338/32 R |
| 5,723,198 A | 3/1998 | Hosoe et al. ................ 428/141 |
| 5,756,202 A | 5/1998 | Van Kesteren et al. ..... 428/332 |
| 5,766,743 A | 6/1998 | Fujikata et al. ............. 428/212 |
| 5,932,343 A | 8/1999 | Hayashi et al. ............. 428/332 |
| 5,968,676 A | 10/1999 | Araki et al. ................. 428/692 |
| 5,989,690 A | 11/1999 | Fujikata et al. ............. 428/212 |
| 6,038,107 A | 3/2000 | Pinarbasi .................... 360/113 |
| 6,051,309 A | 4/2000 | Fujikata et al. ............. 428/332 |
| 6,077,586 A | 6/2000 | Bian et al. ................. 428/65.3 |
| 6,090,480 A | 7/2000 | Hayashi ...................... 428/332 |
| 6,090,498 A | 7/2000 | Omata et al. ............... 428/692 |
| 6,159,593 A | 12/2000 | Iwasaki et al. ............. 428/332 |
| 6,280,813 B1 | * 8/2001 | Carey et al. ............... 428/65.3 |
| 6,372,330 B1 | * 4/2002 | Do et al. .................... 428/212 |
| 6,383,668 B1 | * 5/2002 | Fullerton et al. .... 428/694 TM |

FOREIGN PATENT DOCUMENTS

JP 61113122 5/1986

OTHER PUBLICATIONS

"Longitudinal Magnetic Recording Media with Thermal Stabilization" by E.N. Abarra et al, Intermag 2000, Digest of Technical Papers, 2000 IEEE International Magnetics Conference, Apr. 9–13, 2000.

* cited by examiner

Primary Examiner—Holly Rickman
(74) Attorney, Agent, or Firm—Morrison & Foerster LLP (57) ABSTRACT

Laminated magnetic recording medium with two Co-containing layers separated by a non-magnetic interlayer is stablished by Ru-containing layers between the recording layers and Co-containing stablization layers through antiferromagnetic coupling.

22 Claims, 6 Drawing Sheets

Carbon overcoat 31

1st Co-containing recording layer 32

1st Ru layer 33

1st Co-containing stabilization layer 34

CoCr-containing interlayer 35

2nd Co-containing recording layer 36

2nd Ru layer 37

2nd Co-containing stabilization layer 38

Cr-containing underlayer 39

Protective overcoat 23

Magnetic layer 22

Underlayer 21

Substrate 20

Underlayer 21'

Magnetic layer 22'

Protective overcoat 23'

Figure 3

Carbon overcoat 31

1st Co-containing recording layer 32

1st Ru layer 33

1st Co-containing stabilization layer 34

CoCr-containing interlayer 35

2nd Co-containing recording layer 36

2nd Ru layer 37

2nd Co-containing stabilization layer 38

Cr-containing underlayer 39

Figure 4.

| | |
|---|---|
| | Carbon overcoat 41 |
| | 1st Co-containing recording layer 42 |
| | 1st Ru layer 43 |
| | 1st Co-containing stabilization layer 44 |
| | 2nd Ru layer 45 |
| | 2nd Co-containing stabilization layer 46 |
| | CoCr-containing interlayer 47 |
| | 2nd Co-containing recording layer 48 |
| | 3rd Ru layer 49 |
| | 3rd Co-containing stabilization layer 50 |
| | 4th Ru layer 51 |
| | 4th Co-containing stabilization layer 52 |
| | Cr-containing underlayer 53 |

LAMINATED MEDIUM WITH ANTIFERROMAGNETIC STABILIZATION LAYERS

RELATED APPLICATIONS

This application claims priority from Provisional Application Serial No. 60/221,220 filed Jul. 25, 2000, entitled "Laminated Medium With Antiferomagnetic Stabilization Layers," the entire disclosure of which is hereby incorporated herein by reference.

FIELD OF INVENTION

This invention relates to magnetic recording media, such as thin film magnetic recording disks, and to a method of manufacturing the media. The invention has particular applicability to high areal density longitudinal magnetic recording media having very low medium noise and high degree of thermal stability, and more particularly, to a laminated medium with antiferromagnetic stabilization layers.

BACKGROUND

The increasing demands for higher areal recording density impose increasingly greater demands on thin film magnetic recording media in terms of remanent coercivity (Hr), magnetic remanance (Mr), coercivity squareness (S*), signal-to-medium noise ratio (SMNR), and thermal stability of the media. In particular, as the SMNR is reduced by decreasing the grain size or reducing exchange coupling between grains, it has been observed that the thermal stability of the media decreases. Therefore, it is extremely difficult to produce a magnetic recording medium satisfying above mentioned demanding requirements.

Magnetic discs and disc drives provide quick access to vast amounts of stored information. Both flexible and rigid discs are available. Data on the discs is stored in circular tracks and divided into segments within the tracks. Disc drives typically employ one or more discs rotated on a central axis. A magnetic head is positioned over the disc surface to either access or add to the stored information. The heads for disc drives are mounted on a movable arm that carries the head in very close proximity to the disc over the various tracks and segments.

Figure 1:
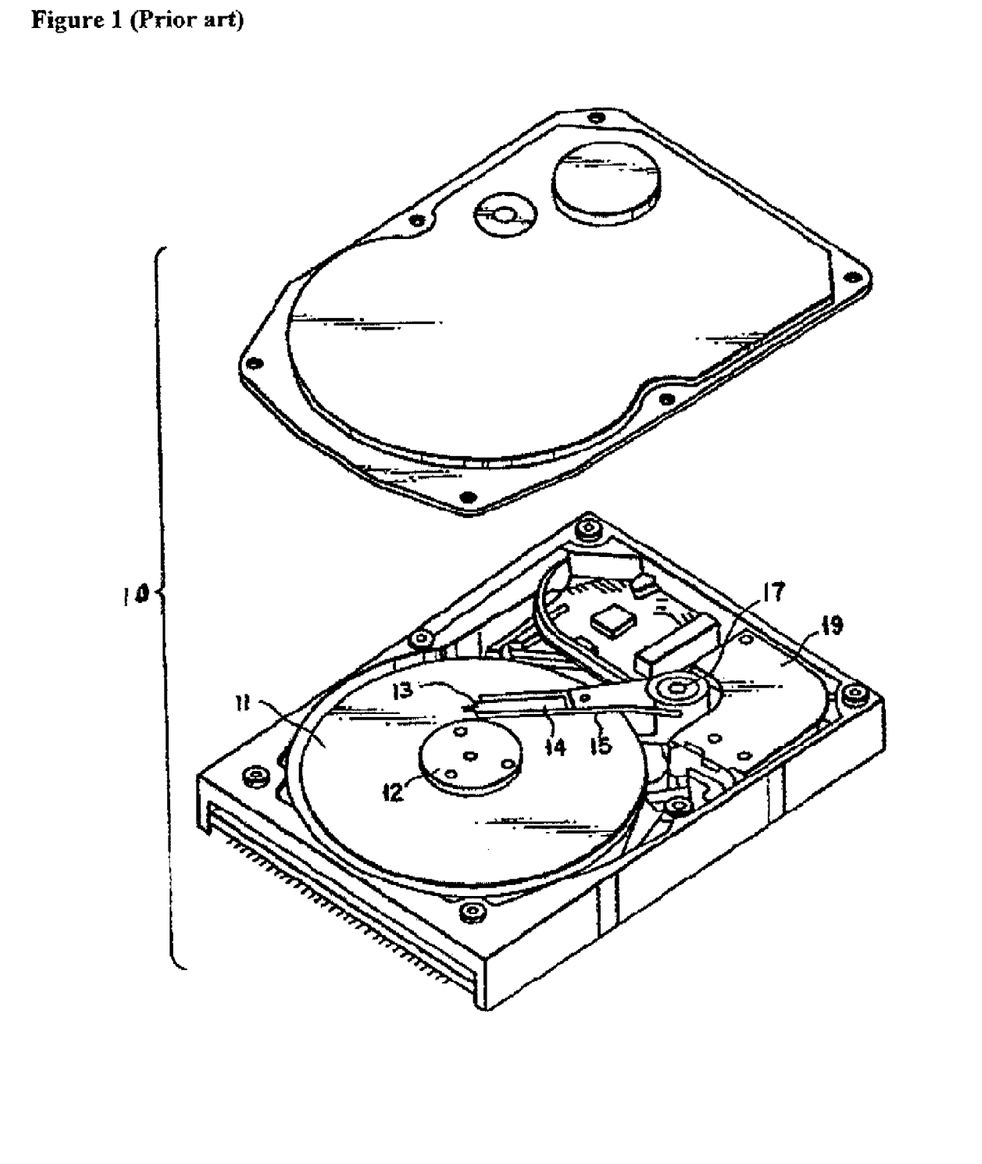
FIG. 1 is a view of a magnetic disk drive.

FIG. 1 shows the schematic arrangement of a magnetic disk drive 10 using a rotary actuator. A disk or medium 11 is mounted on a spindle 12 and rotated at a predetermined speed. The rotary actuator comprises an arm 15 to which is coupled a suspension 14. A magnetic head 13 is mounted at the distal end of the suspension 14. The magnetic head 13 is brought into contact with the recording/reproduction surface of the disk 11. A voice coil motor 19 as a kind of linear motor is provided to the other end of the arm 15. The arm 15 is swingably supported by ball bearings (not shown) provided at the upper and lower portions of a pivot portion 17.

Figure 2:
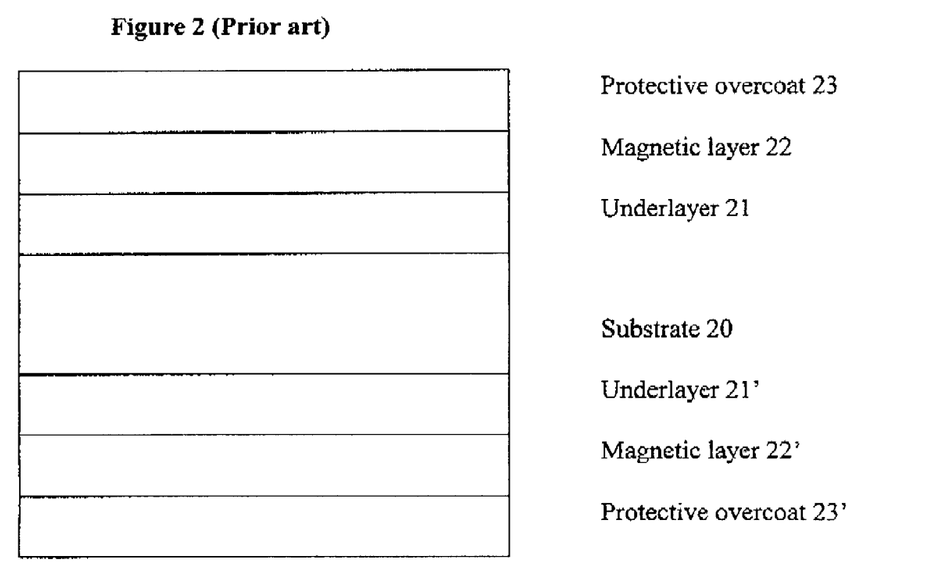
FIG. 2 is a schematic representation of the film structure in accordance with a magnetic recording medium of the prior art.

A cross sectional view of a conventional longitudinal recording disk medium is depicted in FIG. 2. A longitudinal recording medium typically comprises a non-magnetic substrate 20 having sequentially deposited on each side thereof an underlayer 21, 21', such as chromium (Cr) or Cr-containing, a magnetic layer 22, 22', typically comprising a cobalt (Co)-base alloy, and a protective overcoat 23, 23', typically containing carbon. Conventional practices also comprise bonding a lubricant topcoat (not shown) to the protective overcoat. Underlayer 21, 21', magnetic layer 22, 22', and protective overcoat 23, 23', are typically deposited by sputtering techniques. The Co-base alloy magnetic layer deposited by conventional techniques normally comprises polycrystallites epitaxially grown on the polycrystal Cr or Cr-containing underlayer.

A conventional longitudinal recording disk medium is prepared by-depositing multiple layers of films to make a composite film. In sequential order, the multiple layers typically comprise a non-magnetic substrate, one or more underlayers, one or more magnetic layers, and a protective carbon layer. Generally, a polycrystalline epitaxially grown cobalt-chromium (CoCr) alloy magnetic layer is deposited on a chromium or chromium-alloy underlayer.

Conventional methods for manufacturing a longitudinal magnetic recording medium with a glass, glass-ceramic, Al or Al—NiP substrate may also comprise applying a seedlayer between the substrate and underlayer. A conventional seedlayer seeds the nucleation of a particular crystallographic texture of the underlayer. Conventionally, a seedlayer is the first deposited layer on the non-magnetic substrate. The role of this layer is to texture (alignment) the crystallographic orientation of the subsequent Cr-containing underlayer, and might also produce small grain size, which is desired for the purpose of reducing recording noise.

The seedlayer, underlayer, and magnetic layer are conventionally sequentially sputter deposited on the substrate in an inert gas atmosphere, such as an atmosphere of argon. A conventional carbon overcoat is typically deposited in argon with nitrogen, hydrogen or ethylene. Conventional lubricant topcoats are typically about 20 Å thick.

A substrate material conventionally employed in producing magnetic recording rigid disks comprises an aluminum-magnesium (Al—Mg) alloy. Such Al—Mg-alloys are typically electrolessly plated with a layer of NiP at a thickness of about 15 microns to increase the hardness of the substrates, thereby providing a suitable surface for polishing to provide the requisite surface roughness or texture.

Other substrate materials have been employed, such as glass, e.g., an amorphous glass, glass-ceramic material that comprises a mixture of amorphous and crystalline materials, and ceramic materials. Glass-ceramic materials do not normally exhibit a crystalline surface. Glasses and glass-ceramics generally exhibit high resistance to shocks.

According to the domain theory, a magnetic material is composed of a number of submicroscopic regions called domains. Each domain contains parallel atomic magnetic moments and is always magnetized to saturation (Ms), but the directions of magnetization of different domains are not necessarily parallel. In the absence of an applied magnetic field, adjacent domains may be oriented randomly in any number of several directions, called the directions of easy magnetization, which depend on the geometry of the crystal, stress, etc. The resultant effect of all these various directions of magnetization may be zero, as is the case with an unmagnetized specimen. When a magnetic field is applied, the domains most nearly parallel to the direction of the applied field may grow in size at the expense of the others. This is called boundary displacement of the domains or the domain growth. Domains may also rotate and align parallel to the applied field. When the material reaches the point of saturation magnetization, no further domain growth and rotation would take place on increasing the strength of the magnetic field.

The ease of magnetization or demagnetization of a magnetic material depends on the crystal structure, grain orientation, the state of strain, and the direction of the magnetic field. The magnetization is most easily obtained along the easy axis of magnetization but most difficult along the hard axis of magnetization. A magnetic material is said to posses a magnetic anisotropy when easy and hard axes exist. On the other hand, a magnetic material is said to be isotropic when there are no easy or hard axes. A magnetic material is said to possess a uniaxial anisotropy when the easy axis is oriented along a single crystallographic direction, and to possess multiaxial anisotropy when the easy axis aligns with multiple crystallographic directions.

"Anisotropy energy" is the work against the anisotropy force to turn magnetization vector away from an easy direction. For example, a single crystal of iron, which is made up of a cubic array of iron atoms, tends to magnetize in the directions of the cube edges along which lie the easy axes of magnetization. A single crystal of iron requires about $1.4 \times 10^5$ ergs/cm$^3$ (at room temperature) to move magnetization into the hard axis of magnetization from an easy direction, which is along a cubic body diagonal.

The anisotropy energy $U_A$ could be expressed in an ascending power series of the direction cosines between the magnetization and the crystal axes. For cubic crystals, the lowest-order terms take the form of Equation (1), $$U_A = K_1(\alpha_1^2\alpha_2^2 + \alpha_2^2\alpha_3^2 + \alpha_3^2\alpha_1^2) + K_2(\alpha_1^2\alpha_2^2\alpha_3^2) \qquad (1)$$

where $\alpha_1$, $\alpha_2$ and $\alpha_3$ are direction cosines with respect to the cube, and $K_1$, and $K_2$ are temperature-dependent parameters characteristic of the material, called anisotropy constants.

Anisotropy constants can be determined from (1) analysis of magnetization curves, (2) the torque on single crystals in a large applied field, and (3) single crystal magnetic resonance. The term "anisotropy constant" is often referred to as magnetocrystalline anisotropy constant.

While Equation (1) applies for a cubic lattice, similar equations are also known for other lattice systems. For example, for a hexagonal close packed (HCP) lattice, the equation for $U_A$ is the following:

$$U_A = K_1 \sin^2\theta + K_2 \sin^4\theta \qquad (2)$$

where $\theta$ is the angle between the Ms vector, i.e., the saturation magnetization direction, and the c axis (easy axis), and $K_1$ and $K_2$ are anisotropy constants.

The requirements for high areal density, i.e., higher than 30 Gb/in$^2$, impose increasingly greater requirements on magnetic recording media in terms of coercivity, remanent squareness, medium noise and track recording performance. It is extremely difficult to produce a magnetic recording medium satisfying such demanding requirements, particularly a high-density magnetic rigid disk medium for longitudinal and perpendicular recording. The magnetic anisotropy of longitudinal and perpendicular recording media makes the easily magnetized direction of the media located in the film plane and perpendicular to the film plane, respectively. The remanent magnetic moment of the magnetic media after magnetic recording or writing of longitudinal and perpendicular media is located in the film plane and perpendicular to the film plane, respectively.

Important magnetic properties, such as coercivity (Hc), remanent magnetization (Mr) and coercive squareness (S*), which are crucial to the recording performance of the Co alloy thin film for a fixed composition, depend primarily on its microstructure. For thin film longitudinal magnetic recording media, the desired crystalline structure of the Co and Co alloys is HCP with uniaxial crystalline anisotropy and a magnetization easy direction along the c-axis is in the plane of the film. The better the in-plane c-axis crystallographic texture, the higher the coercivity of the Co alloy thin film used for longitudinal recording. This is required to achieve a high remanence. For very small grain sizes coercivity increases with increased grain size. As grain size increases, noise increases. There is a need to achieve high coercivities without the increase in noise associated with large grains. To achieve a low noise magnetic medium, the Co alloy thin film should have uniform small grains with grain boundaries that can magnetically isolate neighboring grain diameters. This kind of microstructure and crystallographic texture is normally achieved by manipulating the deposition process, or most often by the proper use of an underlayer.

The linear recording density can be increased by increasing the Hr of the magnetic recording medium, and by decreasing the medium noise, as by maintaining very fine magnetically non-coupled grains. Medium noise in thin films is a dominant factor restricting increased recording density of high-density magnetic hard disk drives, and is attributed primarily to inhomogeneous grain size and intergranular exchange coupling. Accordingly, in order to increase linear density, medium noise must be minimized by suitable microstructure control and, therefore, several techniques have been disclosed in the prior art.

For example, U.S. Pat. No. 5,462,796 (Teng) teaches a laminated longitudinal magnetic recording medium with Cr-containing non-magnetic layer between two magnetic layers. This medium exhibits a lower medium noise than that of a conventional medium without the Cr-containing interlayer. However, when the medium Mrt is below 0.6 memu/cm$^2$, the laminated medium has very poor thermal stability, which will be shown below. As recording density increases to about 30 Gb/in$^2$, medium Mrt has been reduced to about 0.35 memu/cm$^2$. Regular laminated medium can not be used in such low Mrt regime due to thermal stability issue.

Abarra et al. ("Longitudinal magnetic recording media with thermal stabilization", AA-06, Intermag 2000 Digest of Technical papers, 2000 IEEE International Magnetics Conference, Toronto, Canada, Apr. 9–13, 2000.) reported the approach to insert a Ru film about 8 Å thick into two ferromagnetic layers to enhance the thermal stability of the recording layer, located on the top of Ru film.

CoCr films with Cr concentration around 37 atomic percent are non-magnetic films with hexagonal structure. Ohkijima et al. ("Effect of CoCr interlayer on longitudinal recording," IEEE Transactions on Magnetics, Vol. 33, No. 5, pp. 2944–2946, September 1997) reported the use of CoCr layer deposited between Cr underlayer and CoCrTa magnetic layer.

In order to squeeze as much digital information as possible on a recording disc medium there is a need to find a film structure, which can benefit the low noise feature of laminated medium, but has acceptable thermal stability. Furthermore, in order to obtain high enough signal output, and reduce the medium noise of the medium with antiferromagnetic stabilization layers, further improvement of the medium is necessary.

SUMMARY OF THE INVENTION

Applicants recognized that the antiferromagnetic interactions of two Co-containing magnetic layers, one of the Co-containing magnetic layers being a magnetic recording layer and the other being a stabilization layer, separated by a thin Ru film magnetically stabilize the magnetic recording layer. Applicants also recognized that the use of a CoCr-containing non-magnetic hexagonal-structured film in between two Co-containing magnetic layers provides decoupling and improved epitaxial growth of the Co-containing magnetic layers.

The invention provides a magnetic recording medium for high areal recording density exhibiting low noise and high degree of thermal stability. One way of achieving this goal is to produce a magnetic recording medium having (1) a non-magnetic layer, preferably, a Ru-containing layer, between two Co-containing magnetic layers, one of the Co-containing magnetic layers being a magnetic recording layer and the other being a stabilization layer, and (2) a non-magnetic interlayer, preferably, a CoCr-containing non-magnetic hexagonal-structured layer, in between two Co-containing magnetic recording layers.

An embodiment of this invention is a magnetic recording medium, comprising a Co-containing recording layer and an additional Co-containing recording layer separated by a non-magnetic interlayer, and further comprising a Ru-containing layer and a Co-containing stabilization layer, wherein the magnetic recording medium is thermally stable. The magnetic recording medium could further comprise an additional Ru-containing layer and an additional Co-containing stabilization layer. The Co-containing recording layer and the additional Co-containing recording layer each could have n pairs of the Ru-containing layer and the Co-containing stabilization layer deposited immediately under the recording layer, wherein n is more than 1. The Ru-containing layer could have a thickness in a range of about 0.6 to 1.2 nm. The non-magnetic interlayer could comprise a hexagonal-structured non-magnetic film having a similar lattice constant as that of the Co-containing recording layer. The non-magnetic interlayer could comprise Cr and X, wherein the X is selected from the group consisting of V, Mo, W, Ti, Ru and RuW and the X is capable of expanding the lattice constant of the non-magnetic interlayer. The thickness of the non-magnetic interlayer could be in a range of about 0.5 to 5 nm. The Co-containing stabilization layer could comprise a Co-containing alloy selected from the group consisting of CoCrPt, CoCrPtTa, CoCrPtTaNb and CoCrPtB. The Co-containing stabilization layer could have a thickness in a range of about 1 to 5 nm. The Co-containing recording layer and/or the additional Co-containing recording layer could comprise a Co-containing alloy selected from the group consisting of CoCrPt, CoCrPtTa, CoCrPtTaNb, and CoCrPtB, and have a thickness in a range of about 4 to 12 nm.

Another embodiment of this invention is a method of manufacturing a magnetic recording medium comprising, depositing a Co-containing stabilization layer on a Cr-containing underlayer, depositing a Ru-containing layer on the Co-containing stabilization layer, depositing a Co-containing recording layer on the Ru-containing layer, depositing a non-magnetic interlayer on the Co-containing recording layer, and depositing an additional Co-containing recording layer on the non-magnetic interlayer.

Yet, another embodiment is a magnetic recording medium, comprising a pair of magnetic recording layers separated by means for improving thermal stability of the magnetic recording medium. In this invention, "means for improving thermal stability of the magnetic recording medium" is a combination of a Ru-containing layer and a Co-containing layer, a combination of a Ru-containing layer and a CoCr-containing non-magnetic layer or combinations thereof.

As will be realized, this invention is capable of other and different embodiments, and its details are capable of modifications in various obvious respects, all without departing from this invention. Accordingly, the drawings and description are to be regarded as illustrative in nature and not as restrictive.

DETAILED DESCRIPTION

The recording media of the invention may be a rigid magnetic disc rotatable about an axis that is incorporated into a disc drive shown in FIG. 1. Disc drives such as this are standard equipment in the industry. See, Mee, C. D. and Daniel, E. D., MAGNETIC RECORDING, Vols. I–III (McGraw-Hill pub. 1987); F. Jorgenson, The Complete Handbook of Magnetic Recording, Chapter 16 (3rd. ed. 1988), and U.S. Pat. No. 5,062,021, the relevant disclosures of which are incorporated herein by reference. The magnetic recording media of the present invention may also be used with flexible magnetic discs or tapes using known flexible substrates.

This invention provides magnetic recording media suitable for high areal recording density exhibiting high thermal stability and high SMNR. This invention achieves such technological advantages by providing (1) a Ru-containing layer between two Co-containing magnetic layers, one of the Co-containing magnetic layers being a magnetic recording layer and the other being a stabilization layer, and (2) a CoCr-containing non-magnetic hexagonal-structured layer in between two Co-containing magnetic layers. In this application, word "containing," for example in Ru-containing, means that the layer comprises the elements or compounds before the word "containing" but the layer could still include other elements and compounds.

The ratio $K_u V/k_B T$ determines the thermal stability of magnetic recording media. In another words, it estimates the signal decay of the magnetic recording media. In the above ratio, $K_u$ is an anisotropy constant defined by the equation $K_u = K_1 + 2K_2$, wherein $K_1$ and $K_2$ are the anisotropy constants of Equation (2), V is the volume of magnetic switching units, which can approximately be represented by magnetic grains, $K_B$ is Boltzman's constant and T is temperature in Kelvin.

Lu and Charap, "Thermal instability at 10 Gbit/in$^2$ magnetic recording," IEEE TRANSACTION ON MAGNETICS, Vol. 30, No. 6, pp. 4230–4232, November 1994, discloses that $K_u V/k_B T$ must be at least 60 in order for the written bits to be marginally stable. In this invention, a recording layer is "thermally stable" when $K_u V/k_B T$ is at least 60.

Figure 3:
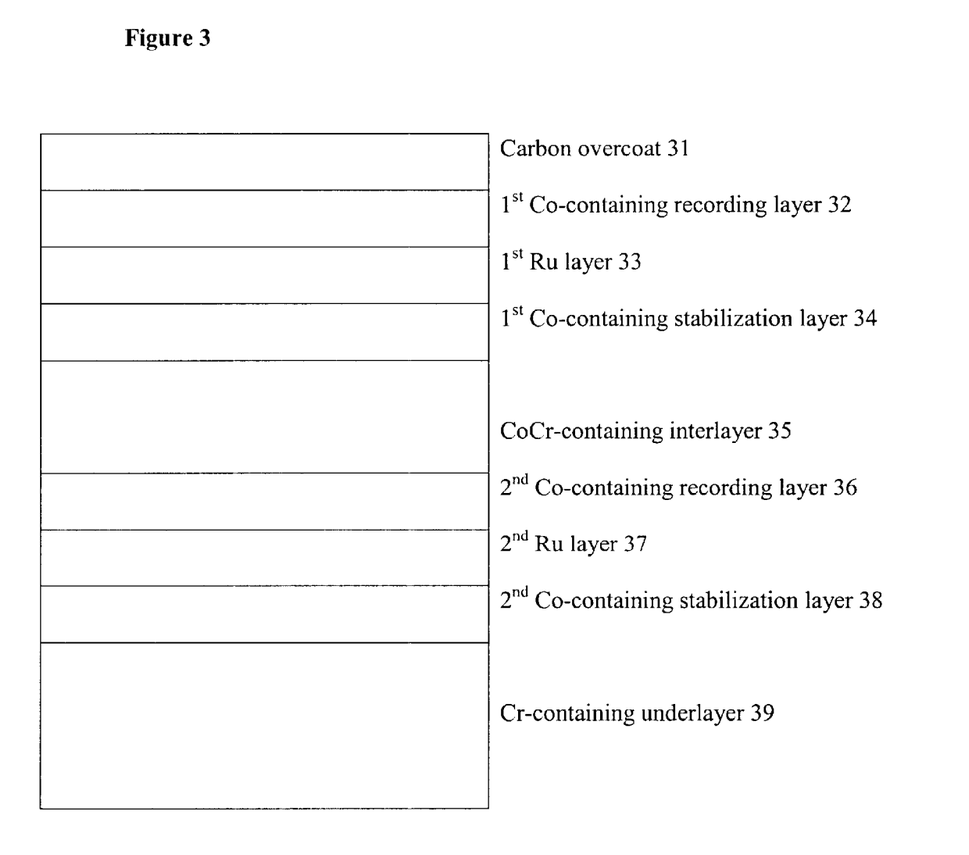
FIG. 3 is a schematic representation of the film structure of a laminated medium with antiferromagnetic stabilization layers in accordance with an embodiment of this invention.
Figure 4:
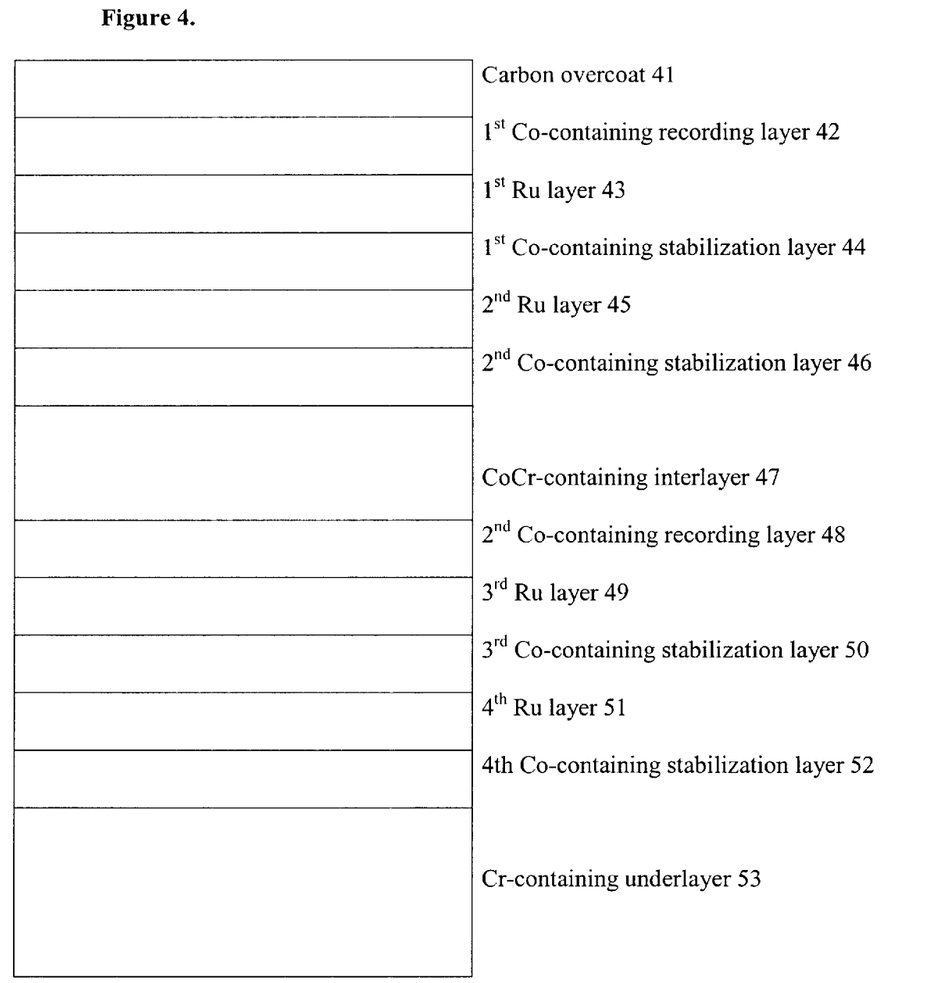
FIG. 4 is a schematic representation of the film structure of a laminated medium with antiferromagnetic stabilization layers in accordance with an embodiment of this invention.

In one embodiment, a Co-containing stabilization layer and a non-magnetic layer, preferably, a Ru-containing layer, together thermally stabilize a Co-containing recording layer FIGS. 3 and 4 show the film structures of two embodiments of this invention. FIG. 3 shows a Cr-containing underlayer 39 deposited on a substrate (not shown). Sequentially, from the top of the film structure of FIG. 3 to the Cr-containing underlayer 39, are a carbon overcoat 31, a $1^{st}$ Co-containing recording layer 32, a $1^{st}$ Ru layer 33, a $1^{st}$ Co-containing stabilization layer, a CoCr-containing interlayer 35, a $2^{nd}$ Co-containing recording layer 36, a $2^{nd}$ Ru layer 37 and a $2^{nd}$ Co-containing stabilization layer 38. In one embodiment, the underlayer causes the easy axis of the $2^{nd}$ Co-containing stabilization layer 38 to be in-plane through epitaxial growth.

Another embodiment of this invention is shown in FIG. 4. There may be n pairs of Ru layer and Co-containing stabilization layer between the $1^{st}$ Co-containing recording layer 42 and CoCr-containing interlayer 47, wherein n is more than 1. There may be m pairs of Ru layer and Co-containing stabilization layer between the $2^{nd}$ Co-containing recording layer 48 and Cr-containing underlayer 53 where m is more than 1. The values of n and m may be the same or different.

The Co-containing recording layer can comprise any Co-based alloy such as CoCrPt, CoCrPtTa, CoCrPtTaNb, CoCrPtB. Each recording layer can be single magnetic layer or dual magnetic layers immediately adjacent to each other. The alloy of the $2^{nd}$ Co-containing recording layer may or may not be the same as the alloy of the $1^{st}$ recording layer. The thickness of each recording layer can be in the range of 4 nm to 12 nm. The Ru layer thickness is about 0.6 to 1.2 nm, and should be optimized to obtain antiferromagnetic coupling of the two layers adjacent to it. The Co-containing stabilization layers can have a thickness from about 1 to 5 nm, and comprise any kind of Co-based alloy, such as CoCrPt, CoCrPtTa, CoCrPtTaNb, CoCrPtB. The CoCr-containing interlayer can comprise, for example, any CoCr-based hexagonal-structured non-magnetic alloy, with Cr concentration around 37 atomic percent, such as CoCr, CoCrPt, CoCrTa, CoCrW, CoCrMo. The addition of Pt, Ta, W, or Mo into the Cr-containing or CoCr-containing interlayer material expands the lattice constant of these materials. The lattice match from the Co-containing recording layer, through the interlayer, to the Co-containing stabilization layer is improved by the addition of Pt, Ta, W, or Mo into the CoCr-containing interlayer material. Other hexagonal-structured non-magnetic film with similar lattice constants as that of Co-containing recording layers also can be used as an interlayer. The edge length of the base plane of the lattice of a hexagonal structure is "a." The distance between two base planes of the lattice of a hexagonal structure is "c." When the absolute values of the relevant difference of "a" values of two hexagonal structures and the absolute value of the relevant difference of "c" values of two hexagonal structures are both less than 6%, it means that these two structures have "similar lattice constants."

A Cr-containing alloy, such as CrV, CrMo, CrW, CrTi, CrRu, and CrRuW, also can be used as the interlayer. The addition of V, W, Ti, Ru, and RuW expands the lattice constant of the Cr-containing interlayer, and promotes the epitaxial growth of the Cr-containing interlayer, the Co-containing recording layer and the Co-containing stabilization layer. The thickness of the interlayer is about 0.5 to 5 nm.

In a preferred embodiment of this invention, the Co-containing recording layers are divided into two parts, and separated by a non-magnetic hexagonal CoCr-based alloy interlayer, a Ru layer, and a Co-containing stabilization layer. The interlayer significantly reduces the exchange coupling between the Co-recording layer and Co-containing stabilization layer on top of the interlayer. The Ru layer at a thickness of about 8 Å makes the adjacent Co-containing layers have opposite magnetization at zero applied magnetic field. The playback signals are induced mainly from $1^{st}$ and $2^{nd}$ Co-containing recording layers.

In a variation, there could further be a subseedlayer and a seedlayer of about 1.0 nm to 160 nm thickness each below the Cr-containing underlayer 39 to nucleate growth. A portion of the subseedlayer, the seedlayer and/or the underlayer could be oxidized by being sputter deposited with Ar and oxygen to promote a decrease in grain size. The term "a portion of" is defined herein to include all or part of a layer. Therefore, the entire layer, i.e., extending from one end of the layer to the opposite end of the layer may be in the oxidized form.

The carbon overcoat in FIGS. 3 and 4 could be further coated with a lubricant layer generally 1 nm to 3 nm thick. The lubricant is preferably a fluoro-chlorocarbon or a perfluoroether. Examples include $CCl_2FCClF_2$, $CF_3(CF_2)_4CF_3$, $CF_3(CF_2)_5CF_3$, $CF_3(CF_2)_{10}CF_3$, and $CF_3(CF_2)_{16}CF_3$.

The substrates that may be used in the invention include glass, glass-ceramic, aluminum/NiP, metal alloys, plastic/polymer material, ceramic, glass-polymer, composite materials or other non-magnetic materials.

The Cr-containing underlayer in. FIGS. 3 and 4 may form a (112) orientation when deposited on a B2 structured seedlayer such as NiAl. Then, a magnetic layer having a substantially Co(10.0) crystallographic orientation is deposited on the Cr-containing underlayer. The Cr-containing underlayers shown in FIGS. 3 and 4 may also form a (200) orientation when deposited on Al/NiP substrates. Then, a magnetic layer having a substantially Co(11.0) crystallographic orientation is deposited on the Cr-containing underlayer.

Desirably, the lattice constant and the crystal plane of the seedlayer, if used, should closely match that of the Cr-containing underlayer. As a consequence of lattice and crystalline plane matching, the magnetic layer will grow in a close-packed hexagonal structure with a Co(10.0) or Co(11.0) crystallographic orientations predominantly parallel to the film plane-with the magnetic easy axis, c-axis, lying predominantly in the film plane.

In a preferred embodiment, the thickness of the B2 structure seedlayer could be about 30 Å to about 1600 Å, preferably between about 40 Å and about 1200 Å, and most preferably about 600 Å. The thickness of the underlayer could be about 20 Å to about 500 Å, preferably between about 25 Å and about 250 Å, and most preferably about 100 Å. The thickness of the recording layer could be about 40 Å to about 120 Å, preferably between about 50 Å and about 100 Å, and most preferably about 55–80 Å. The thickness of the stabilization layer could be about 10 Å to about 50 Å, preferably between about 15 Å and about 45 Å, and most preferably about 20–40 Å. The thickness of the Ru-containing layer could be about 6 Å to about 12 Å, preferably between about 7 Å and about 9 Å, and most preferably about 8 Å. The thickness of the interlayer could be about 5 Å to about 50 Å, preferably between about 15 Å and about 40 Å, and most preferably about 15–25 Å. The thickness of the protective layer could be about 20 Å to about 300 Å, preferably between about 25 and 100 Å, and most preferably about 40 Å. The protective layer could be made of hydrogenated carbon ($CH_x$).

The magnetic recording medium has a remanent coercivity of about 2000 to about 10,000 Oersted, and an Mrt (product of remanance, Mr, and magnetic layer thickness, t) of about 0.2 to about 2.0 memu/cm². In a preferred embodiment, the coercivity is about 2500 to about 9000

Oersted, more preferably in a range of about 3000 to about 6000 Oersted, and most preferably in a range of about 3350 to about 5000. Oersted. In a preferred embodiment, the Mrt is about 0.25 to about 1 memu/cm$^2$, more preferably in a range of about 0.3 to about 0.6 memu/cm$^2$, and most preferably in a range of about 0.3 to about 0.5 memu/cm$^2$.

EXAMPLES

All samples described in this disclosure were fabricated with DC magnetron sputtering. SMNR was measured using a Guzik 1701 spinstand. It analyzes the noise spectrum from the output of a read head you attach to it. The background noise and dc-noise were subtracted to leave only the noise coming from the media themselves.

Table 1 lists magnetic properties and thermal decay data for various media tested at 75° C. and linear density of 175 kfci. Sample A is a laminated medium, i.e., a magnetic recording medium comprising a first Co-containing recording layer and a second Co-containing recording layer separated by a non-magnetic interlayer. All other samples are not laminated. Samples A, C, D, F, G and H had the film structures shown in Table II. Among all the samples in Table I, laminated sample A has the highest SMNR and worst signal decay.

TABLE I

| Sample ID | Hr (kOe) | Mrt (memu/cm$^2$) | S* | S ($\mu$ Vrms) | SMNR (dB) | PW50 ($\mu$inch) | OW (dB) | decay (%/dec) |
|---|---|---|---|---|---|---|---|---|
| A | 3.1 | 0.68 | 0.85 | 122.2 | 23.3 | 7.9 | 33.9 | −1.53 |
| C | 3.5 | 0.58 | 0.87 | 108.7 | 22.7 | 7.7 | 30.8 | −0.55 |
| D | 3.0 | 0.71 | 0.86 | 115.2 | 19.6 | 8.3 | 33.5 | −0.46 |
| F | 3.2 | 0.62 | 0.82 | 120.3 | 22.7 | 7.7 | 35.5 | −1.04 |
| G | 3.4 | 0.53 | 0.80 | 86.4 | 20.8 | 7.9 | 35.0 | −0.94 |
| H | 3.2 | 0.46 | 0.85 | 72.7 | 22.8 | 7.5 | 40.0 | −1.04 |

TABLE II

| Sample ID | Substrate | Structure |
|---|---|---|
| A | Al/NiP | CrV/CrMo/CoCrPtTaNb/Cr/CoCrPtTa/C |
| C | Al/NiP | Cr/CrW/CoCr/CoCrPtTaNb/CoCrPtTa |
| D | Al/NiP | CrV/CoCrPtTa |
| F | Glass | NiAl/CrMo/CoCrPtB |
| G | Glass | NiAl/CrMo/CoCrPtB |
| H | Al/NiP | Cr/CrW/CoCr/CoCrPtTaNb |

Example 1

The value of $K_u V/k_B T$ for a laminated medium with the following structure was calculated: Cr/[CoCr$_{18}$Pt$_8$B$_6$ stabilization layer/Ru]$_6$/CoCr$_{18}$Pt$_8$B$_6$ recording layer/CoCr$_{37}$ interlayer/[CoCr$_{18}$Pt$_8$B$_6$ stabilization layer/Ru]$_6$/CoCr$_{18}$Pt$_8$B$_6$ recording layer/carbon, where the subscript 6 outside the bracket containing CoCr$_{18}$Pt$_8$B$_6$ stabilization layer/Ru means six (6) pairs of a CoCr$_{18}$Pt$_8$B$_6$ stabilization layer and a Ru layer. For Mrt of 0.35 memu/cm$^2$, the $K_u$ value was estimated about 1.75×10$^6$ erg/cc at 345K. The two recording layers had a thickness of 12 nm in total with grains of a grain diameter (D) of 9 nm, and each Co-containing stabilization layer had a thickness of 3 nm with grains of grain diameter of 9 nm. In this case, the thickness t for the determination of the value of $K_u V/k_B T$ for the medium is the combined thickness of one recording layer and 6 stabilization layers. V is roughly equal to D$^2$×t. Therefore, the calculated $K_u V/k_B T$ value is about 71.

Comparative Example 1

The value of $K_u V/k_B T$ of a widely used magnetic medium with a single CoCr$_{18}$Pt$_8$B$_6$ layer was calculated using the following parameters. For Mrt of 0.35 memu/cm$^2$, the $K_u$ value was the measured $K_u$ value of the medium at 345° K, which is the estimated maximum operation temperature of the disc drives, of about 2.5×10$^6$ erg/cc. The thickness of the single magnetic layer about 12 nm with grains having a grain diameter of about 9 nm. Therefore, at a temperature of 345° K, the calculated $K_u V/k_B T$ value is about 51, which is not high enough to have a thermally stable performance.

When a non-magnetic interlayer completely decouples two layers of recording layers with identical thickness of 6 nm of a conventional laminated medium, the $K_u V/k_B T$ value is 25.5, which is half of that of a single layer medium, even though we assume that the two decoupled recording layers have the same $K_u$ value as that of a single layer medium. Here, we assume that the laminated medium and a single layer medium have identical grain diameters of 9 nm.

In Example 1, the volume of the Co-containing stabilization layers goes into the term V in the expression $K_u V/k_B T$ and, therefore, significantly enhances $K_u V/k_B T$ value because the value of the term V increases. The reason why V increases is because the antiferromagnetic stabilization effect increases the thickness t by including the combined thickness of the recording layers and stabilization layers. As can be seen from Example 1 and Comparative Example 1, the $K_u V/k_B T$ value of the medium according to the current invention is 1.4 times of the value of a single layer medium without lamination and without the antiferromagnetic stabilization layers, and is 2.8 times the value of a conventional laminated medium without the antiferromagnetic stabilization layers.

Example 2

Figure 5:
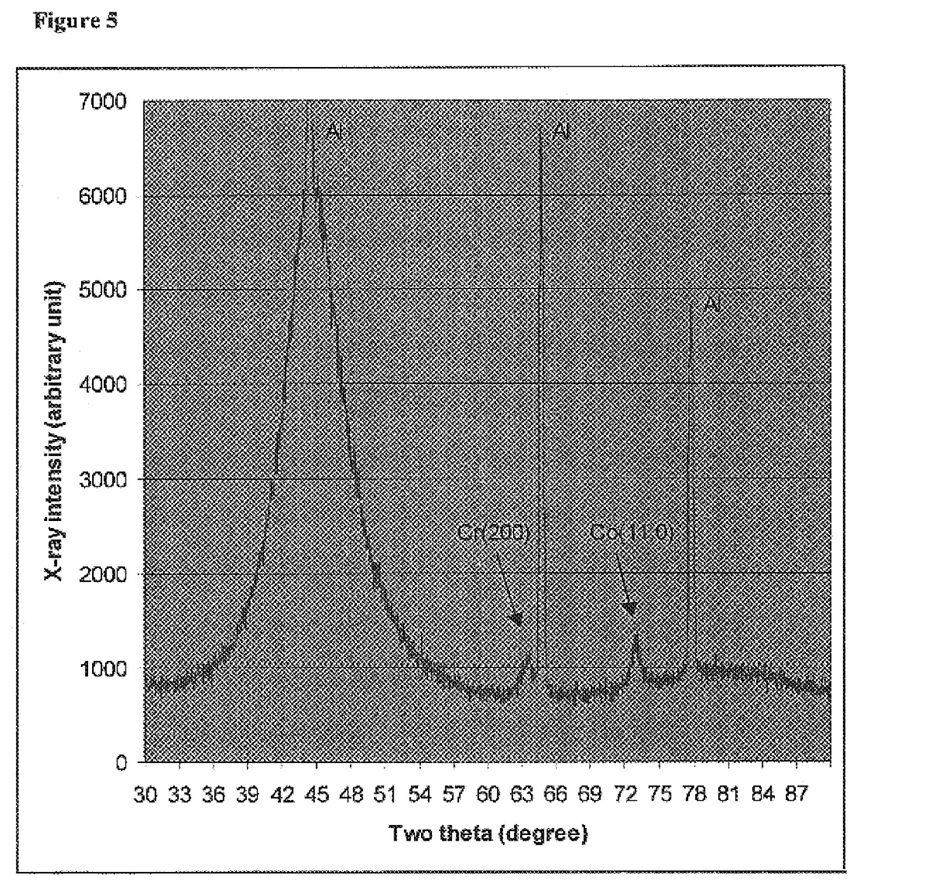
FIG. 5 shows X-ray diffraction pattern of Cr/CrW/CoCr/CoCrPtB/Ru/CoCrPtB films on Al/NiP substrate.
Figure 6:
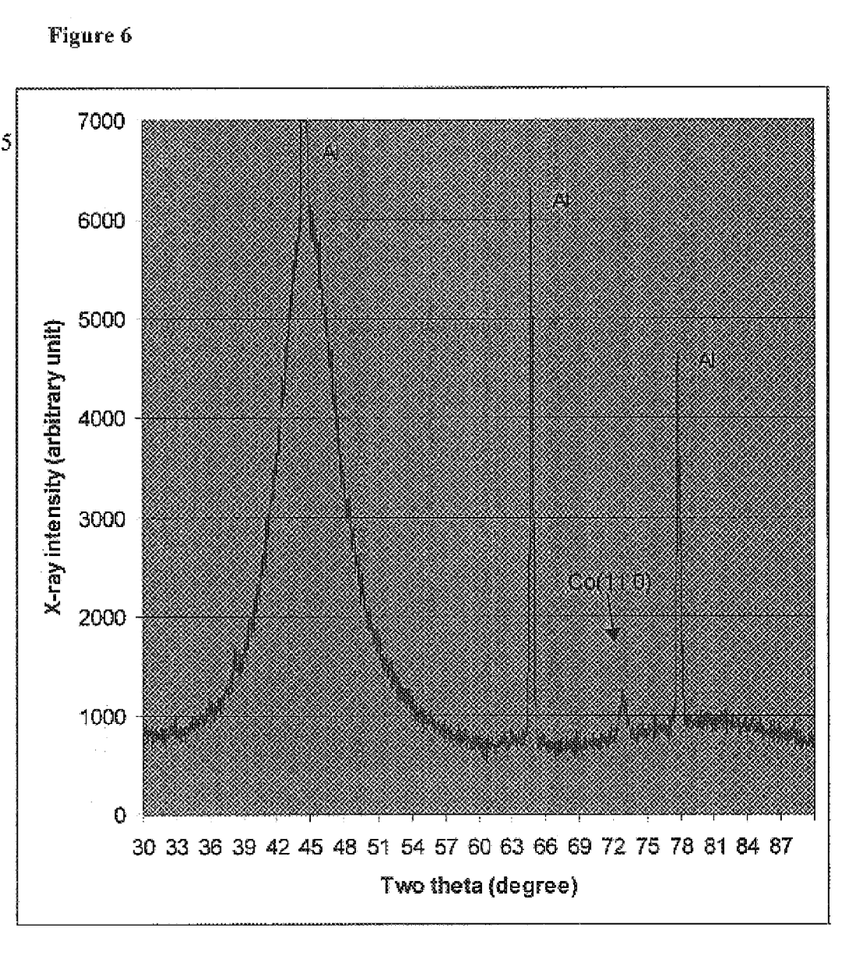
FIG. 6 shows X-ray diffraction patterns of CrW/CoCrPtB/Ru/CoCrPtB/Ru/CoCrPtB films deposited on Al/NiP substrates.

X-ray diffraction (XRD) patterns of 50 Å Cr/57 Å CrW$_{10}$/ 44 Å CoCr$_{37}$/30 Å CoCr$_{14}$Pt$_{10}$B$_{10}$/8 Å Ru/180 Å CoCr$_{16}$Pt$_{10}$B$_{10}$/C films deposited on Al/NiP substrates are shown in FIG. 5. Also, the XRD patterns of 50 Å CrW$_{10}$/30 Å CoCr$_{14}$Pt$_{10}$B$_{10}$/8 Å Ru/30 Å CoCr$_{16}$Pt$_{10}$B$_{10}$/8 Å Ru /180 Å CoCr$_{16}$Pt$_{10}$B$_{10}$/C films deposited on Al/NiP substrates are shown in FIG. 6. Both these two figures show strong Co(11.0) diffraction peaks. No other Co peaks in the scan range of 30 to 90 degrees are observed. The 30 Å CoCr$_{14}$Pt$_{10}$B$_{10}$ and 30 Å CoCr$_{16}$Pt$_{10}$B$_{10}$ films are stabilization layers. The XRD data demonstrate that very good epitaxial growth is obtained from the underlayer to the top recording layer.

In the examples above, a Cr-containing alloy, single or dual layers, can be used as an underlayer. Another kind of CoCr-based interlayer can be optionally inserted between the Cr-containing underlayer and the bottom Co-containing stabilization layer. Beneath the underlayer, optionally, NiAl, NiPOx, and other seed layers can be deposited. The substrates can be any kinds of non-magnetic substrates, such as, Al/NiP, glass, glass-ceramic and Si. The multilayer films can be deposited on both sides of the disc substrates, or one side of the substrates.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein.

Finally, the entire disclosure of the patents and publications referred in this application are hereby incorporated herein by reference.

What is claimed is:

1. A magnetic recording medium, comprising a Co-containing recording layer and an additional Co-containing recording layer separated by a non-magnetic interlayer, and further comprising a Ru-containing layer below the additional Co-containing recording layer and/or the Co-containing recording layer and a Co-containing stabilization layer below the Ru-containing layer, wherein the magnetic recording medium is thermally stable, further wherein the non-magnetic interlayer provides decoupling of the Co-containing recording layer and the additional Co-containing recording layer and the Ru-containing layer provides magnetic coupling of two adjacent layers.

2. The magnetic recording medium of claim 1, further comprising an additional Ru-containing layer and an additional Co-containing stabilization layer.

3. The magnetic recording medium of claim 1, wherein the Co-containing recording layer and the additional Co-containing recording layer each has n pairs of the Ru-containing layer and the Co-containing stabilization layer deposited immediately under the recording layer, wherein n is more than 1.

4. The magnetic recording medium of claim 1, wherein the Ru-containing layer has a thickness in a range of about 0.6 to 1.2 nm.

5. The magnetic recording medium of claim 1, wherein the non-magnetic interlayer comprises Cr and X, wherein said X is one or more elements selected from the group consisting of V, Mo, W, Ti and Ru and said X is capable of expanding the lattice constant of the non-magnetic interlayer.

6. The magnetic recording medium of claim 1, wherein the thickness of the non-magnetic interlayer is in a range of about 0.5 to 5 nm.

7. The magnetic recording medium of claim 1, wherein the Co-containing stabilization layer comprises a Co-containing alloy selected from the group consisting of CoCrPt, CoCrPtTa, CoCrPtTaNb and CoCrPtB.

8. The magnetic recording medium of claim 1, wherein the Co-containing stabilization layer has a thickness in a range of about 1 to 5 nm.

9. The magnetic recording medium of claim 1, wherein the Co-containing recording layer and/or the additional Co-containing recording layer comprises a Co-containing alloy selected from the group consisting of CoCrPt, CoCrPtTa, CoCrPtTaNb, and CoCrPtB, and has a thickness in a range of about 4 to 12 nm, further wherein optionally the Co-containing recording layer has a same composition as that of the additional Co-containing recording layer.

10. A method of manufacturing a magnetic recording medium comprising:
    depositing a Co-containing stabilization layer on a Cr-containing underlayer,
    depositing a Ru-containing layer on the Co-containing stabilization layer,
    depositing a Co-containing recording layer on the Ru-containing layer,
    depositing a non-magnetic interlayer on the Co-containing recording layer, and
    depositing an additional Co-containing recording layer on the non-magnetic interlayer, wherein the non-magnetic interlayer provides decoupling of the Co-containing recording layer and the additional Co-containing recording layer and the Ru-containing layer provides magnetic coupling of two adjacent layers.

11. The method of manufacturing a magnetic recording medium of claim 10, wherein the medium is thermally stable.

12. The method of manufacturing a magnetic recording medium of claim 10, further comprising depositing an additional Co-containing stabilization layer and depositing an additional Ru-containing layer, in this order, between the non-magnetic interlayer and the additional Co-containing recording layer.

13. The method of manufacturing a magnetic recording medium of claim 10 wherein the Co-containing recording layer and/or the additional Co-containing recording layer comprises a Co-containing alloy selected from the group consisting of CoCrPt, CoCrPtTa, CoCrPtTaNb, and CoCrPtB.

14. The method of manufacturing a magnetic recording medium of claim 10, wherein the non-magnetic interlayer comprises Cr or CoCr.

15. The method of manufacturing a magnetic recording medium of claim 10, wherein the non-magnetic interlayer comprises Cr or CoCr and an element that expands a lattice constant of the non-magnetic interlayer.

16. The method of manufacturing a magnetic recording medium of claim 10, wherein the Ru-containing layer has a thickness in a range of about 0.6 to 1.2 nm.

17. The method of manufacturing a magnetic recording medium of claim 10, wherein the thickness of the non-magnetic interlayer is in a range of about 0.5 to 5 nm.

18. The method of manufacturing a magnetic recording medium of claim 10, wherein the Co-containing stabilization layer has a thickness in a range of about 1 to 5 nm.

19. A magnetic recording medium, comprising a Ru-containing layer, a Co-containing stabilization layer and a pair of magnetic recording layers, in this order, said pair of magnetic recording layers being separated by means for providing noise reduction of the magnetic recording medium, wherein said means provides decoupling of said pair of magnetic recording layers and the Ru-containing layer provides magnetic coupling of two adjacent layers.

20. A method of manufacturing a magnetic recording medium comprising:
    depositing a Co-containing stabilization layer on a Cr-containing underlayer,
    depositing a Ru-containing layer on the Co-containing stabilization layer,
    depositing a Co-containing recording layer on the Ru-containing layer,
    depositing a non-magnetic interlayer on the Co-containing recording layer, and
    depositing an additional Co-containing recording layer on the non-magnetic interlayer, wherein the non-magnetic interlayer comprises Cr or CoCr and the Ru-containing layer provides magnetic coupling of two adjacent layers.

21. A magnetic recording medium, comprising a Ru-containing layer, a Co-containing stabilization layer and a pair of magnetic recording layers separated by means for providing noise reduction of the magnetic recording medium, wherein said means comprises Cr or CoCr and the Ru-containing layer provides magnetic coupling of two adjacent layers.

22. A magnetic recording medium, comprising a Ru-containing layer, a Co-containing stabilization layer and a pair of magnetic recording layers, in this order, said pair of magnetic recording layers being separated by means for providing noise reduction of the magnetic recording medium, wherein said means comprises Cr or CoCr and the Ru-containing layer provides magnetic coupling of two adjacent layers.

* * * * *